United States Patent
Ko et al.

(10) Patent No.: US 11,882,354 B2
(45) Date of Patent: Jan. 23, 2024

(54) SYSTEM FOR ACQUISITING IRIS IMAGE FOR ENLARGING IRIS ACQUISITION RANGE

(71) Applicant: KT&C CO., LTD, Seoul (KR)

(72) Inventors: Ki Seok Ko, Incheon (KR); Jeong Geun Kim, Cheonan-si (KR); Jong Bae Park, Seoul (KR); Hyuk Sub Kwon, Seoul (KR)

(73) Assignee: KT&C CO., LTD, Seoul (KR)

( * ) Notice: Subject to any disclaimer, the term of this patent is extended or adjusted under 35 U.S.C. 154(b) by 58 days.

(21) Appl. No.: 17/628,003

(22) PCT Filed: Aug. 10, 2021

(86) PCT No.: PCT/KR2021/010536
§ 371 (c)(1),
(2) Date: Jan. 18, 2022

(87) PCT Pub. No.: WO2022/124518
PCT Pub. Date: Jun. 16, 2022

(65) Prior Publication Data
US 2022/0417420 A1  Dec. 29, 2022

(30) Foreign Application Priority Data
Dec. 10, 2020 (KR) .......... 10-2020-0172232

(51) Int. Cl.
*H04N 23/611* (2023.01)
*G06V 40/18* (2022.01)
(Continued)

(52) U.S. Cl.
CPC .......... *H04N 23/611* (2023.01); *G06V 40/18* (2022.01); *H04N 23/45* (2023.01); *H04N 23/56* (2023.01);
(Continued)

(58) Field of Classification Search
CPC ...... H04N 23/611; H04N 23/69; H04N 23/67; H04N 23/56; H04N 23/45; H04N 23/698; G06V 40/18
See application file for complete search history.

(56) References Cited

U.S. PATENT DOCUMENTS 9,307,222 B1 * 4/2016 Tang .............. H04N 23/676
11,190,689 B1 * 11/2021 Wang .............. H04N 23/69
(Continued)

FOREIGN PATENT DOCUMENTS

KR  10-2000-0061066 A  10/2000
KR  10-2004-0029811 A   4/2004
(Continued)

OTHER PUBLICATIONS

Guo et al. "A System for Automatic Iris Capturing", Mitsubishi Electric Research Laborities, Dec. 2005.*
(Continued)

*Primary Examiner* — James T Boylan
(74) *Attorney, Agent, or Firm* — Bret E. Field; Bozicevic, Field & Francis LLP

(57) ABSTRACT

An iris image acquisition system for expanding an iris recognition range is proposed. The iris image acquisition system for expanding the iris recognition range enables that a direction, zoom, and focusing of an iris photographing camera for photographing an iris image of a distant subject are controlled quickly and easily without high-level information processing and arithmetic processing.

3 Claims, 8 Drawing Sheets

(51) Int. Cl.
*H04N 23/69* (2023.01)
*H04N 23/67* (2023.01)
*H04N 23/56* (2023.01)
*H04N 23/45* (2023.01)
*H04N 23/698* (2023.01)

(52) U.S. Cl.
CPC ............. *H04N 23/67* (2023.01); *H04N 23/69* (2023.01); *H04N 23/698* (2023.01)

(56) References Cited

U.S. PATENT DOCUMENTS

| | | | |
|---|---|---|---|
| 2017/0019588 A1* | 1/2017 | Gordon | F16M 11/42 |
| 2021/0289189 A1* | 9/2021 | Sela | A61B 90/361 |
| 2022/0109822 A1* | 4/2022 | Winter | G03B 17/02 |
| 2023/0126960 A1* | 4/2023 | Ogino | H04N 23/69 |
| | | | 348/78 |

FOREIGN PATENT DOCUMENTS

| | | |
|---|---|---|
| KR | 10-0869998 B | 11/2008 |
| KR | 10-2009-0025647 A | 3/2009 |
| KR | 10-2009-0130696 A | 12/2009 |

OTHER PUBLICATIONS

Guo et al., A System for Automatic Iris Capturing, Mitsubishi Electric Research Laboratories, Inc., Dec. 2005, TR2005-044, p. 1-10.

Notification of Reason for Refusal for Republic of Korea Patent Application No. 10-2020-0172232, dated May 10, 2021, and its English translation, 8 pages.

Decision to Grant a Patent for Republic of Korea Patent Application No. 10-2020-0172232, dated Jun. 30, 2021, and its English translation, 4 pages.

* cited by examiner

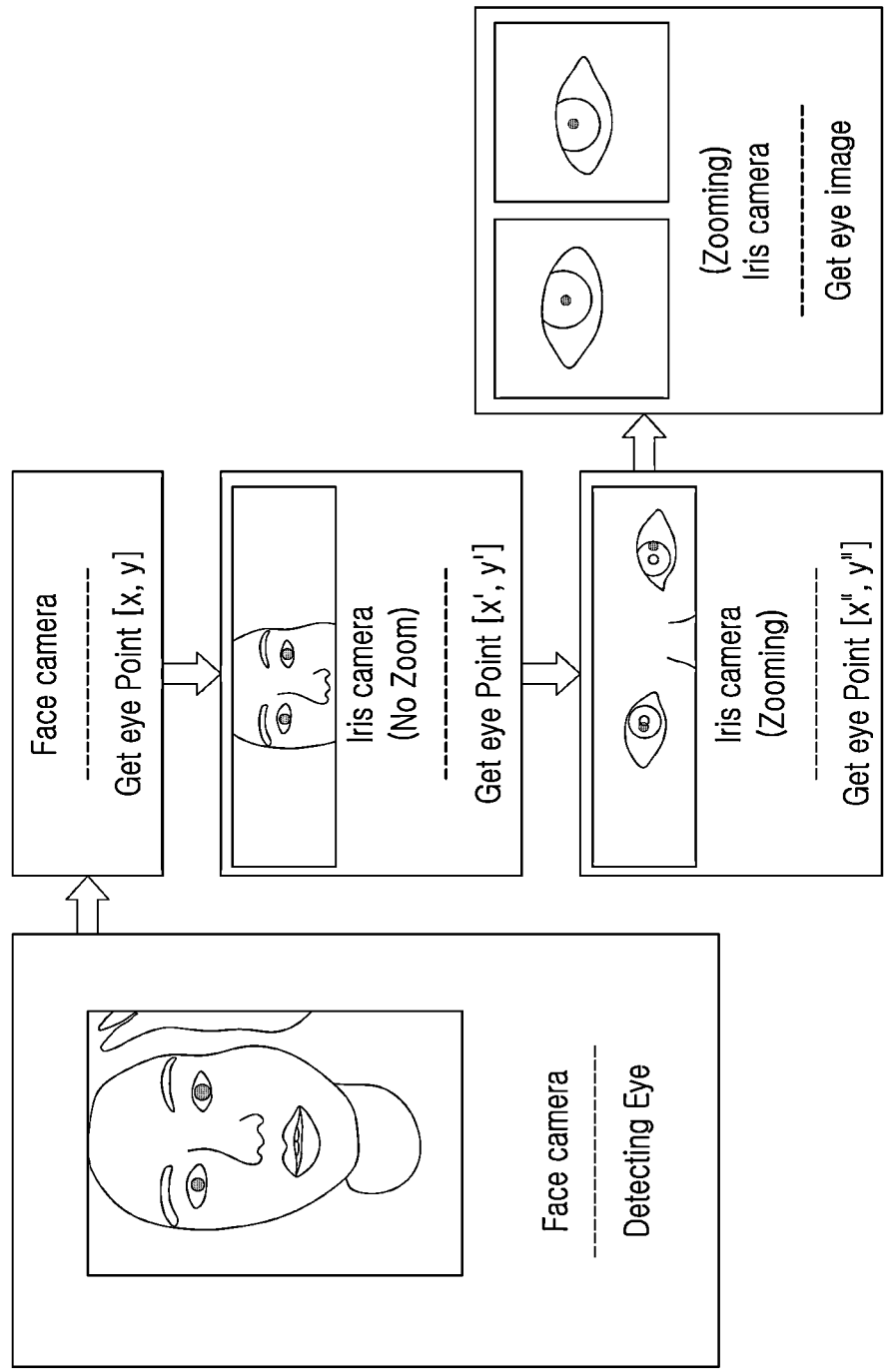

SYSTEM FOR ACQUISITING IRIS IMAGE FOR ENLARGING IRIS ACQUISITION RANGE

CROSS REFERENCE TO RELATED APPLICATION

This Application is a Section 371 National Stage Application of International Application No. PCT/KR2021/010536, filed Aug. 10, 2021, the contents of which is hereby incorporated by reference in its entirety.

BACKGROUND OF THE INVENTION

Field of the Invention

The present disclosure relates to an iris image acquisition system for expanding an iris recognition range, the system allowing an iris image of a subject at a distance to be quickly and accurately acquired.

Description of the Related Art

Unless otherwise indicated in the present disclosure, the content described in this identification item is not related art to the claims of this application and is not admitted to be the related art by inclusion in this identification item.

Recently, application cases of using biometric information such as fingerprints and iris images in the security field have become an increasing trend.

In particular, the iris is one of structural parts of the eye and serves to control the amount of light entering through the pupil, like the aperture of a camera, and is made up of the most complex and sophisticated fibrous tissue in the human body.

The iris forms a comb tooth-shaped pattern in infancy and the iris pattern is hardly changed throughout life. Everyone's iris pattern is different, and even in a case of twins, their own right and left irises are different from each other. In addition, the iris is the only externally identifiable internal organ of the human body, and it is known that the possibility of damage due to external influences is very small as the iris is protected inside the eye lens.

As the uniqueness and permanence of the iris pattern is known to be the most suitable among biological organs for identifying a person, iris recognition is widely applied in the security field through biometric information recognition.

There are also attempts to use the security technology through iris recognition not only in the field of security and access control where proximity iris recognition is required, such as a general door, but also, for example, in the field of security and access control where distant iris recognition is required, such as entrances and exits through which many people pass, in speed gates, airports, port facilities, and the like.

Conventional systems generally applied to such distant iris recognition may include systems respectively developed by Sarnoff Corporation and Mitsubishi Corporation.

Among those systems, a portal system, aka "Iris On the Move", developed by Sarnoff Corporation, is a system configured to use two non-moving single-focus megapixel-class high-resolution cameras and acquire an iris image by photographing a user approaching from a distance to pass a gate, and the portal system has an advantage of demonstrating fast processing speed (20 subjects per minute).

However, in the case of the distant iris recognition system developed by Sarnoff Corporation, there are restrictions on the position and posture of the user passing through the gate, and in particular, since an area photographed by the camera is the entire gate, a significant number of infrared lights are attached to the entire gate to illuminate an entire photographing area, thereby having a disadvantage of increasing the overall system cost.

Likewise, the distant iris recognition system developed by Mitsubishi Corporation is an iris image acquisition system configured to detect a user's face at a distance in a relatively wide operation range by using a pan-tilt device, a single wide-field of view (WFOV) camera, and a single megapixel-class narrow-field of view (NFOV) camera, and use a distance prediction technique using extracted facial feature point information, so as to acquire an iris image, and accordingly there is an advantage of having a relatively wide operation range due to a pan-tilt function.

However, in the case of the distant iris image acquisition system developed by Mitsubishi Corporation, large-scale near-infrared lights are required to exhibit high-power characteristics sufficient to illuminate a photographing area of the megapixel-class narrow-field of view camera, and accordingly, there is a disadvantage of having a difficulty to control the large-scale near-infrared lights to output high power.

In addition, in the case of the conventional distant iris image acquisition system, focusing of a zoom camera for imaging of an iris photographing camera has relied on known autofocusing (AF) technology. However, in the case of the conventional system to which zoom and autofocusing (AF) technologies are applied, there is a problem in that a subject should remain stationary for a certain period of time in order for an autofocusing (AF) algorithm to find an image with the proper focus, the performance is stable only when a user stops and waits for several seconds, and in actual iris photography, movement of the subject to be photographed should be strongly restricted.

In addition, in order to react quickly to the movement of the subject, an operation processor related to high-performance autofocusing (AF) is required, but since most types of acceleration chips are optimized for a visible light area, there is a problem in that the iris photographing method by which only an infrared (IR) area is photographed with high resolution is not suitable.

For these reasons, the conventional iris recognition device is implemented through close-up imaging, and in a case of a system capable of distant photographing, the system is implemented in a method in which expensive parts and equipment are used, and is custom-made and supplied in small quantities. In addition, the iris should be photographed by performing zoom focus control of a lens and light amount control of an IR LED through a technique such as image analysis and the like, whereby resource consumption through multiple stages is high.

Recently, a distant iris image acquisition system has been developed wherein a face recognition camera is introduced in order to confirm a position of the iris, and a pan-tilt (PT) motor is controlled to find a face recognition position so that an iris photographing camera is controlled to face the eyes.

As a method for solving the above-described problems of the related art, in Korean Patent No. 10-0869998 (announced on Nov. 24, 2008), a distant iris image acquisition system is disclosed, the system including: a wide-angle camera configured to photograph a user-detected image; a narrow-angle camera, which is a low-light camera or near-infrared camera, provided with a zoom lens and an auto-focus function, so as to photograph a user's iris image; a near-infrared illumination device mounted on a body of the narrow-angle camera to illuminate a photographing area of the narrow-angle camera only when the narrow-angle camera is operated; a pan-tilt (PT) device configured to pan or tilt the wide-angle camera and the narrow-angle camera, which are mounted in an optical axis proximity parallel structure; and a main processor configured to pan or tilt the PT device so as to position the eyes at a center of a photographed image of the wide-angle camera according to a result of detecting an eye position after confirming the face from the user-detected image photographed by the wide-angle camera, detect the eyes by operating the near-infrared illumination device and tilting the narrow-angle camera until the eyes are detected from the photographed image of the narrow-angle camera, and then vary a zoom lens of the narrow-angle camera to a zoom magnification required to acquire an iris image of a size suitable for iris recognition and acquire the iris image by autofocusing, when the user's eyes are positioned at the center of the photographed image of the narrow-angle camera by panning or tilting the narrow-angle camera.

In addition, in Korean Patent Application Publication No. 10-2009-0130696 (disclosed on Dec. 24, 2009), a distant iris image acquisition system using panning and tilting of a mirror is disclosed, the system including: a wide-angle camera configured to photograph a user-detected image; a narrow-angle camera provided with a zoom lens and a focus lens adjustment function to photograph a user's iris image; a near-infrared illumination device configured to illuminate a photographing area of the narrow-angle camera only when the narrow-angle camera is operated; a mirror member configured to match optical axes of the wide-angle camera and the narrow-angle camera by transmitting or reflecting visible light, or by transmitting or reflecting infrared light in a state disposed in front of the wide-angle camera and the narrow-angle camera; a mirror pan-tilt (PT) device configured to change photographing directions of the wide-angle camera and narrow-angle camera whose optical axes coincide with each other by panning or tilting a total reflection mirror so as to change a path of visible light or infrared light, which are transmitted through the mirror member or reflected by the mirror member; and a main processor configure to pan or tilt a total reflection mirror of the mirror PT device so as to position the eyes at a center of a photographed image of the wide-angle camera according to a result of detecting an eye position after confirming the face from the user-detected image photographed by the wide-angle camera, and then vary a zoom lens of the narrow-angle camera to a zoom magnification required to acquire an iris image of a size suitable for iris recognition and acquire the iris image by autofocusing when the user's eyes are positioned at the center of the photographed image of the narrow-angle camera by panning or tilting the total reflection mirror of the PT device while operating the near-infrared illumination device.

However, in the case of the distant iris image acquisition system using the pan-tilt (PT) device as described above, since high level of information processing and arithmetic processing is required to change zoom magnification of the zoom lens of the narrow-angle camera to a zoom magnification required to acquire the iris image of the size suitable for iris recognition, there is a problem of taking a substantial time and money to acquire an actual distant iris image.

SUMMARY OF THE INVENTION

An objective of the present disclosure is to provide an iris image acquisition system for expanding an iris recognition range, wherein a direction, zoom, and focusing of an iris photographing camera for photographing an iris image of a distant subject may be controlled quickly and easily, without high-level information processing and arithmetic processing, on the basis of information including distance information on distances measured by a distance sensor and geometric mapping information generated on the basis of a distance-specific correlation between a wide-angle face recognition camera capable of estimating a position of a face and eyes of a person and a narrow-angle iris photographing camera capable of zoom-focus control.

In addition, the present disclosure should not be limited to the technical challenges described herein, but it is apparent that other technical challenges could also be derived from the description disclosed herein.

As an exemplary embodiment, the present disclosure proposes an iris image acquisition system for expanding an iris recognition range, the system including: a wide-angle face recognition camera capable of estimating a position of a face and eyes by photographing a subject; a narrow-angle iris photographing camera provided with a zoom lens and a focus lens adjustment function to photograph a subject's iris image; a near-infrared LED configured to emit near-infrared light to a photographing area of the iris photographing camera when the iris photographing camera is operated; a distance sensor configured to measure a distance to the subject; a mapping information database configured to record and store geometric mapping information generated on the basis of distance-specific correlation between the face recognition camera and the iris photographing camera; and a controller configured to control operations of the face recognition camera, the iris photographing camera, the near-infrared LED, and the distance sensor, and control a direction, zoom, and focusing of the iris photographing camera according to information including subject eye position information acquired through the image acquired by the face recognition camera, distance information on the distance to the subject, the distance information being acquired through a sensor signal of the distance sensor, and the geometric mapping information of the mapping information database, the geometric mapping information being mapped to the distance information.

According to a preferred feature of the present disclosure, the iris photographing camera may be installed at a height of 1.3 m so that the iris image may be acquirable regardless of a height of the subject, and may be automatically tiltable by the controller within a range of 30 degree angles upward and 20 degree angles downward.

According to a preferred feature of the present disclosure, the geometric mapping information of the mapping information database may be acquired by interpreting homography information, which varies depending on each of zoom magnifications of the face recognition camera and the iris photographing camera, with a geometrical homography in which spatial information is reflected.

According to a preferred feature of the present disclosure, the geometric mapping information of the mapping information database may be generated on the basis of a correlation coefficient according to a distance between the subject and the face recognition camera and iris photographing camera, and the correlation coefficient may be calculated for each of a plurality of sections by generating first data on the basis of zoom information and focusing information by the distance to the subject, extracting a plurality of reference points whose rate of change according to the distance of the focusing information exceeds a predetermined first threshold point, and dividing the first data into the plurality of sections on the basis of the plurality of reference points.

According to a preferred feature of the present disclosure, the first data may be generated by generating the zoom information by the distance to the subject, calculating a range of depth of field on the basis of the zoom information and the distance to the subject, and generating the focusing information on the basis of the range of the depth of field.

According to a preferred feature of the present disclosure, the plurality of sections may be set so that the range of the depth of field overlaps by a preset range.

According to the iris image acquisition system for expanding the iris recognition range according to an exemplary embodiment of the present disclosure, since the system is installed at entrances or exits through which many people pass, such as speed gates, airports, port facilities, and the like, so as to enable authentication by acquiring an iris image of a person at a distance, there is an advantage that the iris image acquisition system may solve inconvenience of existing commercial products that require a user's eye to be close to a camera for personal authentication and may control access of many people at high speed.

In addition, according to the iris image acquisition system for expanding the iris recognition range according to the exemplary embodiment of the present disclosure, there is an advantage of enabling the direction, zoom, and focusing of the iris photographing camera to be controlled quickly and easily, without high-level information processing and arithmetic processing, on the basis of information including the distance information on distances measured by a distance sensor and the geometric mapping information generated on the basis of a distance-specific correlation between the wide-angle face recognition camera capable of estimating the position of a face and eyes of a person and the narrow-angle iris photographing camera provided with a zoom lens and a focus lens adjustment function to accurately photograph the iris.

In addition, according to the iris image acquisition system for expanding the iris recognition range according to the exemplary embodiment of the present disclosure, the high-level information processing and arithmetic processing such as autofocusing (AF) and image analysis, which are performed in the process of acquiring the iris image of a subject at a distance, are reduced, so that there is an advantage in that the iris image acquisition system may be implemented in embedded systems having limited system resources.

The effects of the present disclosure are not limited to the above-mentioned effects, and other effects not described above will be clearly understood by those skilled in the art from the description of the claims.

BRIEF DESCRIPTION OF THE DRAWINGS

FIG. 8 is a view illustrating the exemplary embodiment of the iris image acquisition system for expanding the iris recognition range according to the exemplary embodiment of the present disclosure.

DESCRIPTION OF THE REFERENCE NUMERALS IN THE DRAWINGS

Figure 1:
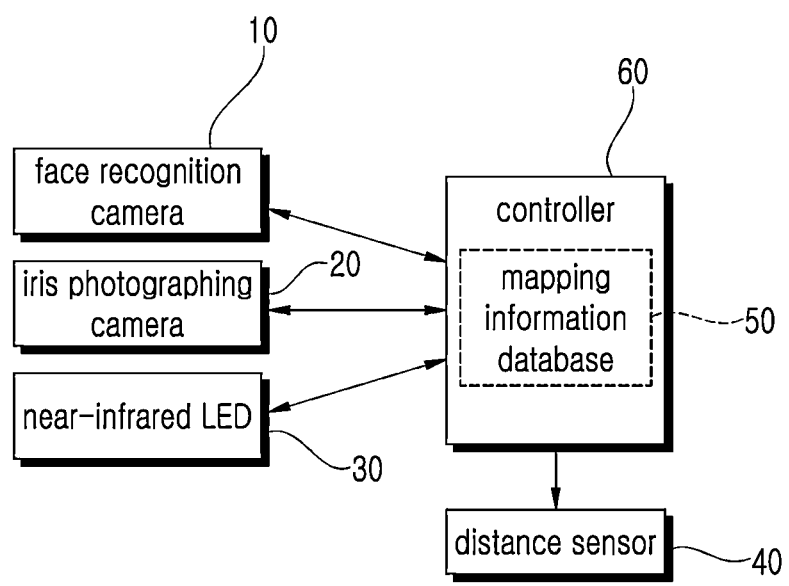
FIG. 1 is an overall block diagram of an iris image acquisition system for expanding an iris recognition range according to an exemplary embodiment of the present disclosure.

10: face recognition camera
20: iris photographing camera
30: near-infrared LED
40: distance sensor
50: mapping information database
60: controller

DETAILED DESCRIPTION OF THE INVENTION

Hereinafter, with reference to the accompanying diagrams, a configuration, operation, and effect of a preferred exemplary embodiment will be described. For reference, in the diagrams, each component is omitted or schematically illustrated for convenience and clarity, and the size of each component does not reflect the actual size. In addition, the same reference numerals throughout the specification refer to the same components, and the reference numerals for the same components in the individual diagrams will be omitted.

FIG. 1 is an overall block diagram of an iris image acquisition system for expanding an iris recognition range according to an exemplary embodiment of the present disclosure.

The iris image acquisition system for expanding the iris recognition range according to the exemplary embodiment of the present disclosure is applied as part of a security facility for access control by being installed not only on general entrance doors requiring iris recognition, but also, for example, at entrances through which many people pass, such as speed gates, airports, and port facilities, and as shown in FIG. 1, the system includes: a wide-angle face recognition camera 10 capable of estimating a position of the face and eyes by photographing a subject; a narrow-angle iris photographing camera 20 provided with a zoom lens and a focus lens adjustment function to photograph a subject's iris image; a near-infrared LED 30 configured to emit near-infrared light to a photographing area of the iris photographing camera 20 when the iris photographing camera 20 is operated; a distance sensor 40 configured to measure a distance to the subject; a mapping information database 50 configured to record and store geometric mapping information generated on the basis of distance-specific correlation between the face recognition camera 10 and the iris photographing camera 20; and a controller 60 configured to control operations of the face recognition camera 10, the iris photographing camera 20, the near-infrared LED 30, and the distance sensor 40, and control a direction, zoom, and focusing of the iris photographing camera according to information including subject eye position information acquired through the image acquired by the face recognition camera 10, distance information on a distance to a subject, the distance information being acquired through a sensor signal of the distance sensor 40, and geometric mapping information of the mapping information database 50, the geometric mapping information being mapped to the distance information.

Here, the face recognition camera 10 is provided as a camera that photographs a visible light image by photographing the subject so that a position of the face and eyes thereof may be estimated.

The face recognition camera 10 provides image data for estimating a position of a face and eyes by photographing a subject-detected image. The face recognition camera 10 is preferable to be a wide-angle camera in which a lens with a field of view of 30 degrees or more is attached to a general color camera, and is also preferable to have a normal zoom function and a tilting function, but may be provided as a fixed camera without the normal zoom function and tilting function.

It is preferable that the face recognition camera 10 is installed at a height of 1.3 m so that an image including the face may be acquired regardless of the height of a subject, and is automatically tiltable by the controller 60 to be described later within a range of 30 degree angles upward and 20 degree angles downward.

The iris photographing camera 20 is installed by being spaced apart from one of a one side, an upper part, or a lower part of the above-described face recognition camera 10 by a predetermined distance. The iris photographing camera 20 has a zoom lens and a focus lens adjustment function, and serves to photograph a subject's iris image.

The iris photographing camera 20 may be a low-light camera (e.g., a VGA-class low-light camera) that obtains a brighter image than that of a general camera by amplifying a small amount of electrical signal generated from a CCD sensor when receiving a small amount of light, but is preferable to be a near-infrared camera having a higher reactivity depending on an infrared wavelength than that of a general surveillance camera in comparison. In addition, the iris photographing camera 20 is preferably a narrow-angle camera to which a zoom lens having an angle of view of 1 degree angles to 5 degree angles is attached.

In addition, it is preferable that the iris photographing camera 20 is installed at the height of 1.3 m so that an iris image may be acquired regardless of the height of the subject, and is automatically tiltable by the controller 60 within a range of 30 degree angles upward and 20 degree angles downward.

In addition, the face recognition camera 10 and the iris photographing camera 20 are arranged to form an intersection point outside a parallel line of sight or a maximum distance set for imaging.

The near-infrared LED 30 is installed in the above-described iris photographing camera 20. The near-infrared LED serves to illuminate a photographing area of the iris photographing camera 20 by emitting near-infrared light to the photographing area of the iris photographing camera 20 when the iris photographing camera 20 is operated.

The near-infrared LED 30 is mounted on the iris photographing camera 20 so as to interwork with the iris photographing camera 20, and is lit only when the iris photographing camera 20 is operated.

The near-infrared LED 30 preferably has an illumination angle sufficient to illuminate an area being photographed by the iris photographing camera 20. For example, in the case of the narrow-angle iris photographing camera 20 having a maximum angle of view of 5 degree angles, a near-infrared LED 30 having an illumination angle of 5 degree angles is applied.

A single near-infrared LED 30 may be mounted on any one position of the top, bottom, left, and right of the body of the iris photographing camera 20 to be lit only when the iris photographing camera 30 is operated. In this case, it is preferable that the reflected light by illumination is focused on or below an area of the iris, the area not being used for iris recognition.

In addition, a total of two near-infrared LEDs 30 may be respectively mounted on the upper and lower sides of the body, or left and right sides of the body of the iris photographing camera 20 to be lit only when the iris photographing camera 20 is operated. In this case, the illumination directions of the two near-infrared LEDs 30 should be inclined toward a photographing area relative to a center line, and as a distance increases, an overlapping areas increase, and accordingly, it is preferable that the iris photographing camera 20 is designed to sufficiently cover the area to be imaged.

In general, since high-power energy is required to photograph near-infrared images at a longer distance, the system output performance is affected in relation with the required high-power energy, thereby leading to a high cost increase that may occur as the distance increases. In order to solve this problem, it is preferable that the near-infrared LED 30 strongly emits near-infrared light only for a period of several milliseconds (ms) or less during which the area corresponding to the position of the iris is imaged under the precise strobing control of the controller 60.

The distance sensor 40 is installed on the body of the above-described face recognition camera 10 or iris photographing camera 20. The distance sensor 40 measures a distance between a subject and the face recognition camera 10 or iris photographing camera 20 and transmits a sensor signal for generating distance information to the controller 60, and may be formed by using a conventional ultrasonic distance sensor.

In addition, the controller 60 for controlling the operations of the above-described face recognition camera 10, iris photographing camera 20, near-infrared LED 30, and distance sensor 40 includes a mapping information database 50.

Figure 2:
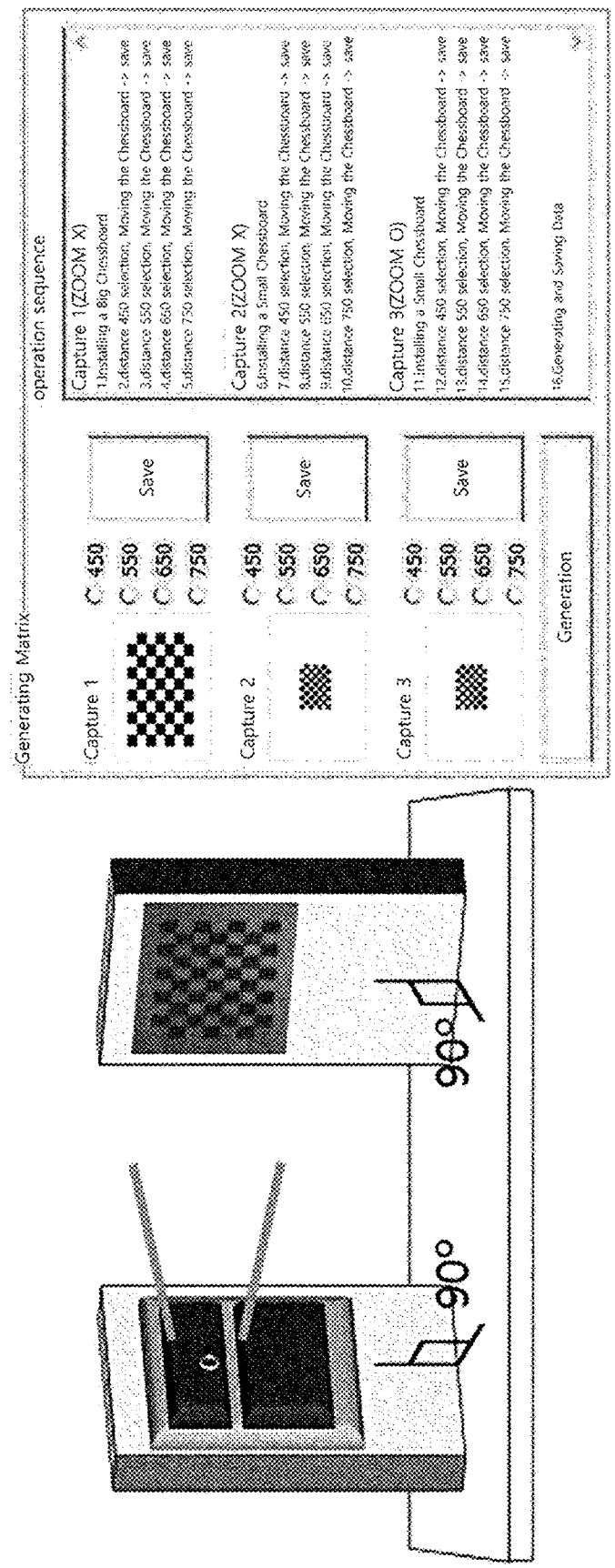
FIG. 2 is a view illustrating the exemplary embodiment of generating geometric mapping information on the basis of a distance-specific correlation between a face recognition camera and an iris photographing camera in the iris image acquisition system for expanding the iris recognition range according to the exemplary embodiment of the present disclosure.

The mapping information database 50 is formed by recording and storing geometric mapping information generated on the basis of a distance-specific correlation between the face recognition camera 10 and the iris photographing camera 20. FIG. 2 illustrates the exemplary embodiment in which the geometric mapping information is generated on the basis of the distance-specific correlation between the face recognition camera and the iris photographing camera.

As shown in FIG. 2, the geometric mapping information of the mapping information database 50 may be acquirable by interpreting homography information, which varies depending on each of zoom magnifications of the face recognition camera 10 and the iris photographing camera 20, with a geometrical homography in which spatial information is reflected.

As a specific method to find out answers to questions of how far and how large a subject to be found in a real image actually is, the specific method includes a method using a hand and a pencil to directly solve the questions geometrically, a method using homography, and a method using 3D transformation.

Among these methods, the homography refers to a constant transformation relationship established between projected corresponding points when one plane is projected onto another plane. Homography is usually expressed as a 3×3 matrix, and is defined as a transformation relationship established for the expression of homogeneous coordinates of the corresponding points. Homography is generally established not only between two planes in a direct projection relationship, but also between all planes directly or indirectly connected by projection relationships.

A method for obtaining an actual position of an object detected in an image by using homography is as follows:

First, arbitrary four points are taken on a floor within a camera field of view, ground coordinates of the four points are measured through actual measurement, and a reference (i.e., origin, and the like) of the ground coordinate system is set. After measuring the ground coordinates of the four points according to the set reference (i.e., the ground coordinate system), image coordinates of the corresponding points (i.e., pixel coordinates in a camera image) are acquired. The calculation of a homography transformation matrix H from the pixel coordinates to the ground coordinates is performed directly by using a findHomogray function of opencv or by using a code below. When the homography matrix H is acquired, the subsequent processes are simple. The ground coordinates corresponding to arbitrary image pixel coordinates p(x, y) are acquired by converting, to 2d coordinates again, a result of multiplying H to (x, y, 1) that expands p to homogeneous coordinates. That is, when $H*(x, y, 1)^T=(a, b, c)^T$, the desired ground coordinates become (a/c, b/c).

Such a geometrical homography analysis technique is already known in the art, and further detailed description will be omitted herein for the sake of simplification of the specification.

The above-described face recognition camera 10, iris photographing camera 20, near-infrared LED 30, and distance sensor 40 are connected to the controller 60 by wired or wireless communication. The controller 60 controls the operations of the face recognition camera 10, iris photographing camera 20, near-infrared LED 30, and distance sensor 40, and includes the above-described mapping information database 50.

In particular, the controller 60 controls the direction, zoom, and focusing of the iris photographing camera 20 according to the subject eye position information acquired through the image acquired by the face recognition camera 10, the distance information on the distance to the subject acquired through the sensor signal of the distance sensor 40, and the geometric mapping information of the mapping information database 50 mapped to the distance information.

In the iris image acquisition system for expanding the iris recognition range according to the exemplary embodiment of the present disclosure, the face recognition camera 10 and the iris photographing camera 20 are formed in a single body frame installed to be tiltable, the controller 60 including the mapping information database 50 may be mounted on this body frame, and the face recognition camera 10 and the iris photographing camera 20 are respectively arranged to be tiltable while being spaced apart from each other according to the exemplary embodiment, and may be connected to the controller 60 including the mapping information database 50 by wire or wireless communication.

Figure 3:
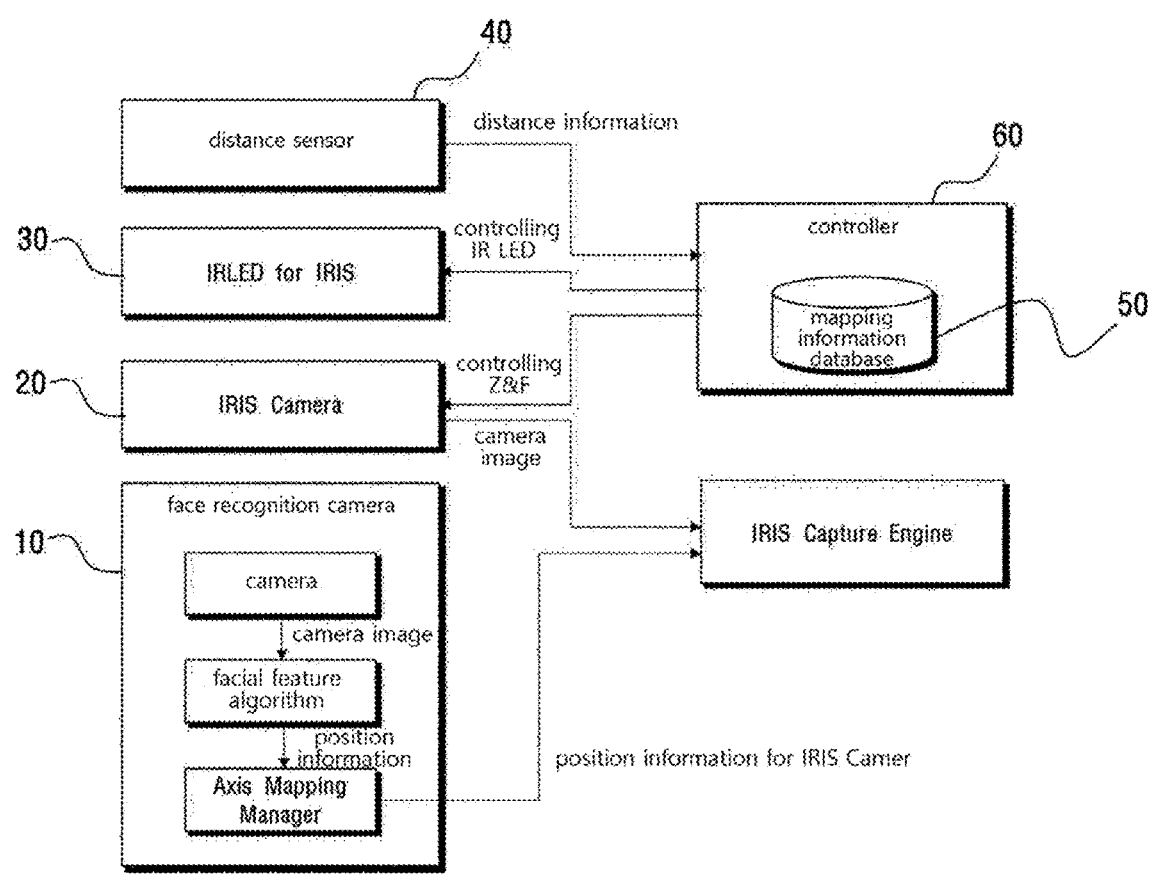
FIG. 3 is a detailed block diagram of the iris image acquisition system for expanding the iris recognition range according to the exemplary embodiment of the present disclosure.

FIG. 3 is a detailed block diagram of the iris image acquisition system for expanding the iris recognition range according to the exemplary embodiment of the present disclosure.

Referring an operation flow of the iris image acquisition system for expanding the iris recognition range according to the exemplary embodiment of the present disclosure, with reference to FIG. 3, first, distance information on a distance to a subject for iris recognition through the distance sensor 40 is extracted, operations of the near-infrared LED 30 and the iris photographing camera 20 are controlled by the controller 60 on the basis of the distance information and the geometric mapping information of the mapping information database 50, and in particular, the zoom and focusing of the iris photographing camera 20 may be controlled. In this case, according to the exemplary embodiment of the present disclosure, as described above, an instant focusing is possible not by an auto-focusing function, but by focusing based on the mapping information, so that high-level calculation is not required and fast processing is possible.

In addition, the iris image acquisition system for expanding the iris recognition range according to the exemplary embodiment of the present disclosure may photograph a subject through the wide-angle face recognition camera 10, may extract an eye position on the basis of a facial feature algorithm, and may accurately photograph the subject's eye position by the iris photographing camera 20 through coordinate mapping.

Figure 4:
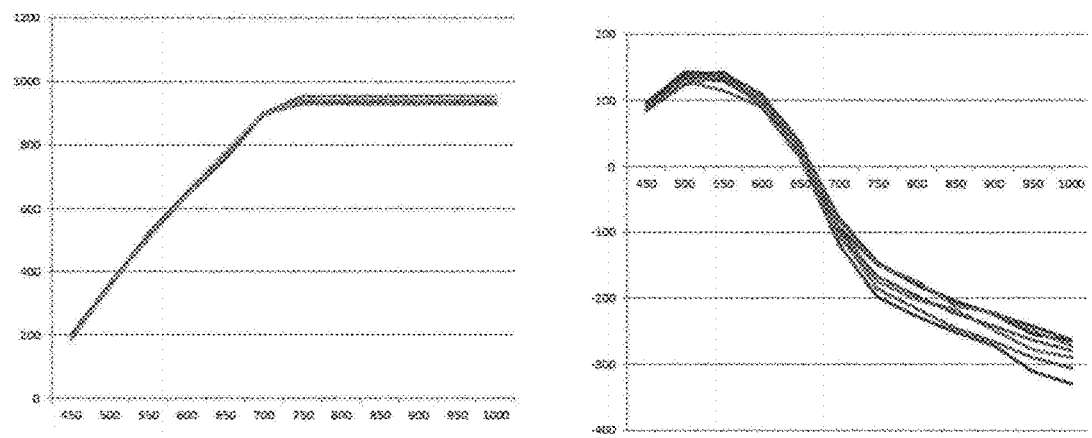
FIG. 4 is an exemplary view illustrating a calibration data analysis for zoom lens tolerance correction according to the exemplary embodiment of the present disclosure.
Figure 5:
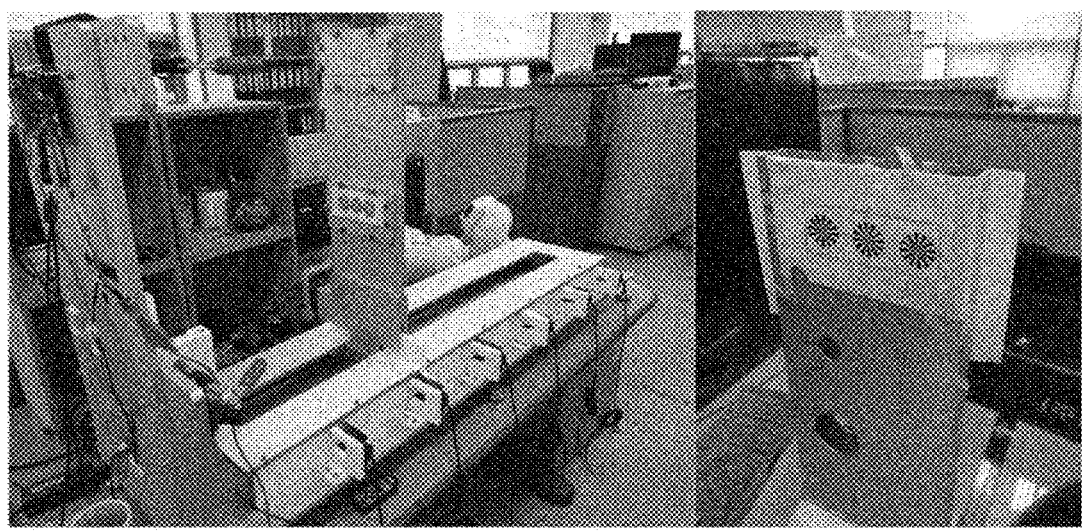
FIG. 5 is a view illustrating the exemplary embodiment in which zoom information and focusing information for each distance are analyzed according to the exemplary embodiment of the present disclosure.
Figure 6:
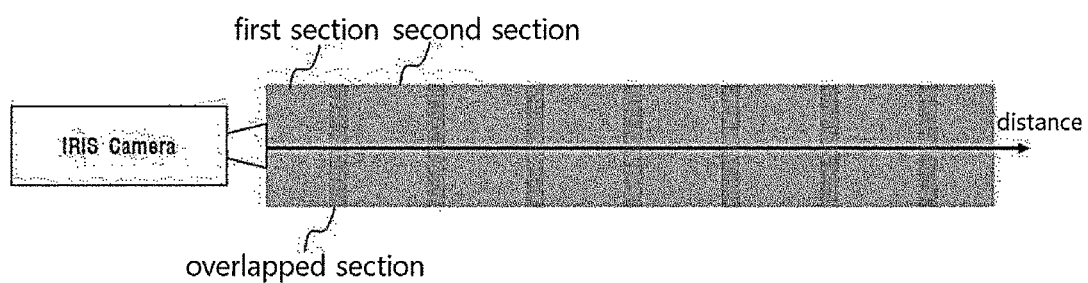
FIG. 6 is a view illustrating the exemplary embodiment in which adjacent sections are set to overlap each other according to the exemplary embodiment of the present disclosure.

FIG. 4 is an exemplary view illustrating a calibration data analysis for zoom lens tolerance correction according to the exemplary embodiment of the present disclosure, FIG. 5 is a view illustrating the exemplary embodiment in which zoom information and focusing information for each distance are analyzed according to the exemplary embodiment of the present disclosure, and FIG. 6 is a view illustrating the exemplary embodiment in which adjacent sections are set to overlap each other according to the exemplary embodiment of the present disclosure.

The geometric mapping information of the mapping information database 50 according to the exemplary embodiment of the present disclosure may be generated on the basis of the correlation coefficient according to the distance between the subject and the face recognition camera 10 and iris photographing camera 20.

Referring to FIGS. 4 to 6, in this case, the correlation coefficient may be calculated for each of a plurality of sections by generating first data on the basis of zoom information and focusing information by the distance to the subject, extracting a plurality of reference points whose rate of change according to the distance of the focusing information exceeds a predetermined first threshold point, and dividing the first data into the plurality of sections on the basis of the plurality of reference points.

The reason for generating the first data by distance is that since a minimum distance for iris recognition is different depending on the distance to the subject, it is preferable to generate, by distance, the zoom information and focusing information of the iris photographing camera 20 according to the distance to the subject.

In this case, in order to quickly process the zoom information and focusing information according to the distance, the first data may be divided into the plurality of sections and the correlation coefficient may be calculated for each section. In this case, the reason for setting the reference points that divides the sections on the basis of a rate of change according to the distance of the focusing information is to secure the minimal sharpness that allows iris recognition to be executable.

In addition, the first data may be generated by generating the zoom information by the distance to the subject, calculating a range of depth of field on the basis of the zoom information and the distance to the subject, and calculating the focusing information on the basis of the range of the depth of field. In this way, the focusing information is generated so that the subject may be included in the depth of field of the camera.

In addition, as described above, the plurality of sections may be set so that the range of depth of field overlaps by a preset range, and thus it may be set so that there is no missing position according to the distance to the subject.

Figure 7:
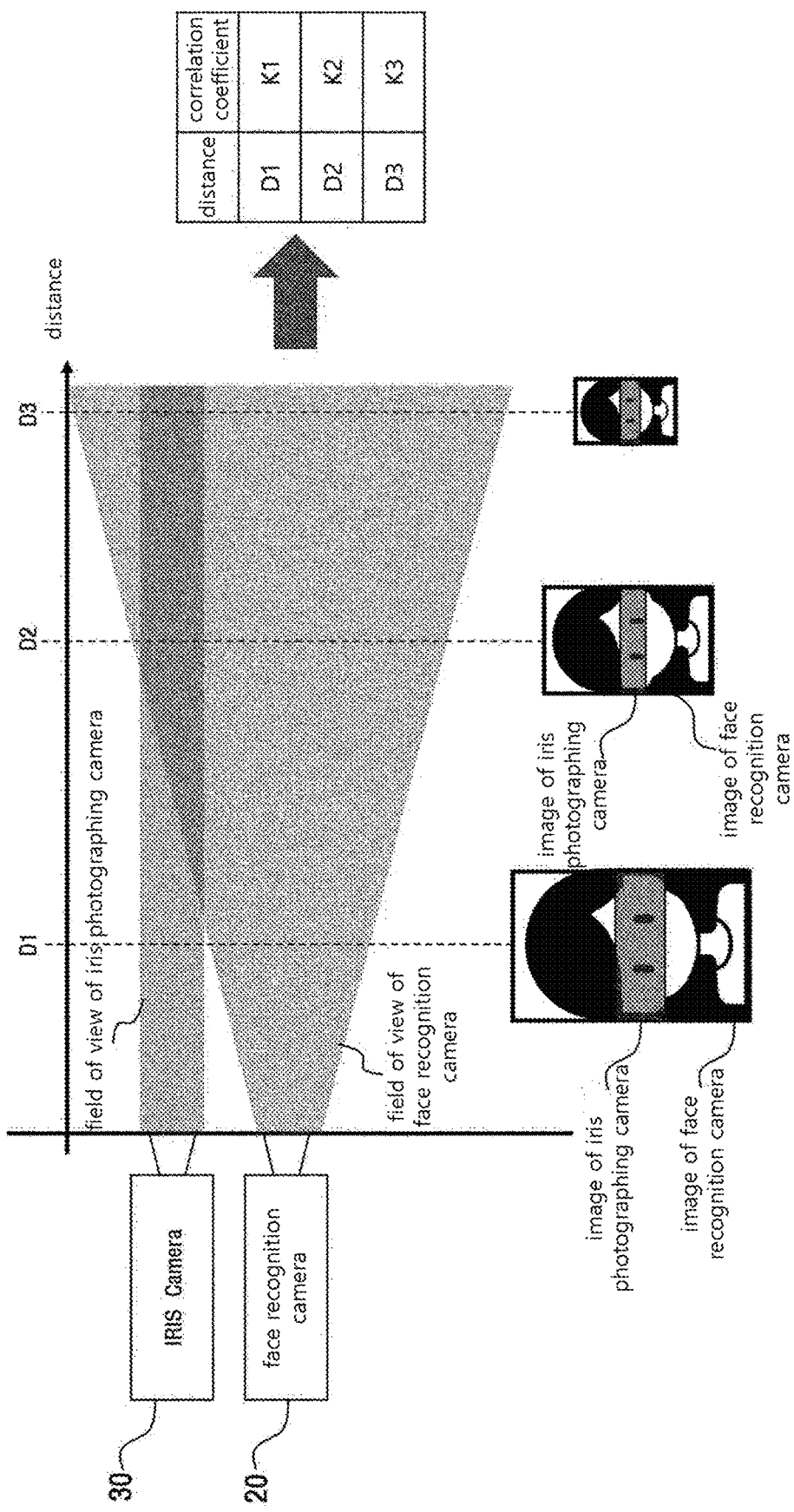
FIG. 7 is a view illustrating a concept of calculating a correlation coefficient according to the exemplary embodiment of the present disclosure.

FIG. 7 is a view illustrating a concept of calculating a correlation coefficient according to the exemplary embodiment of the present disclosure, and FIG. 8 is a view illustrating the exemplary embodiment of the iris image acquisition system for expanding the iris recognition range according to the exemplary embodiment of the present disclosure.

Referring to FIG. 7, according to the exemplary embodiment of the present disclosure, the mapping information may be generated by accumulating correlation coefficients according to the distance between the face recognition camera 10 and the iris photographing camera 20. In this way, the iris recognition may be performed more quickly.

FIG. 8 is a view illustrating an example of tracking the position of the subject's iris by using the correlation coefficient. In the exemplary embodiment of the present disclosure, first, the subject eye position information may be extracted from the subject's face image photographed through the face recognition camera 10, the subject's eyes may be photographed by controlling the iris photographing camera 20 on the basis of the position information of the eyes, and in order to confirm the iris, the subject's eye image may be extracted by controlling the zoom and focusing of the iris photographing camera 20 on the basis of the subject's distance information and the above-described matching information.

As described above, in the case of the iris image acquisition system for expanding the iris recognition range according to the exemplary embodiment of the present disclosure, since the system is installed at entrances or exits through which many people pass, such as speed gates, airports, port facilities, and the like so that a person's iris image may be acquired from a distance for authentication, the iris image acquisition system may solve inconvenience of existing commercial products that require a user's eye to be close to the camera for personal authentication, and may control the access of many people at high speed.

In addition, in the case of the iris image acquisition system for expanding the iris recognition range according to the exemplary embodiment of the present disclosure, it is possible to enable that the direction, zoom, and focusing of the iris photographing camera 20 are controlled quickly and easily, without the high-level information processing and arithmetic processing, on the basis of information including the distance information on distances measured by the distance sensor 40 and the geometric mapping information generated on the basis of the distance-specific correlation between the wide-angle face recognition camera 10 capable of estimating the position of the person's face and eyes and the narrow-angle iris photographing camera 20 provided with the zoom lens and the focus lens adjustment function so as to accurately photograph the iris.

In addition, according to the iris image acquisition system for expanding the iris recognition range according to the exemplary embodiment of the present disclosure, the high-level information processing and arithmetic processing such as autofocusing (AF) and image analysis performed in the process of acquiring the iris image of the subject at the distance are reduced, so that the system may be implemented in embedded systems having limited system resources.

Although preferred exemplary embodiments of the present disclosure have been described above with reference to the accompanying diagrams, the exemplary embodiments described in the description and the configurations illustrated in the diagrams are merely examples and do not exhaustively present the technical spirit of the present disclosure. Accordingly, it should be appreciated that there may be various equivalents and modifications that can replace the exemplary embodiments and the configurations at the time at which the present application is filed. Therefore, the exemplary embodiments described above are to be understood as illustrative and not restrictive in all aspects, and the scope of the present disclosure is indicated by the following claims rather than the detailed description, and the meaning and scope of the claims and their all changes or modifications derived from an equivalent concept should be construed as being included in the scope of the present disclosure.

INDUSTRIAL APPLICABILITY

The present disclosure is applicable to the field of camera equipment or security systems based on the acquisition of a subject's iris image.

What is claimed is:

1. An iris image acquisition system for expanding an iris recognition range, the system comprising:
    a wide-angle face recognition camera estimating a position of a face and eyes by photographing a subject;
    a narrow-angle iris photographing camera provided with a zoom lens and a focus lens adjustment function to photograph a subject's iris image;
    a near-infrared LED configured to emit near-infrared light to a photographing area of the iris photographing camera when the iris photographing camera is operated;
    a distance sensor configured to measure a distance to the subject;
    a mapping information database configured to record and store geometric mapping information generated on the basis of distance-specific correlation between the face recognition camera and the iris photographing camera; and
    a controller configured to control operations of the face recognition camera, the iris photographing camera, the near-infrared LED, and the distance sensor, and control a direction, zoom, and focusing of the iris photographing camera according to information including subject eye position information acquired through the image acquired by the face recognition camera, distance information on the distance to the subject, the distance information being acquired through a sensor signal of the distance sensor, and the geometric mapping information of the mapping information database, the geometric mapping information being mapped to the distance information,
    wherein the geometric mapping information of the mapping information database is generated on the basis of a correlation coefficient according to a distance between the subject and the face recognition camera and iris photographing camera, and the correlation coefficient is calculated for each of a plurality of sections by generating first data on the basis of zoom information and focusing information by the distance to the subject, extracting a plurality of reference points whose rate of change according to the distance of the focusing information exceeds a predetermined first threshold point, and dividing the first data into the plurality of sections on the basis of the plurality of reference points.

2. The system of claim 1, wherein the first data is generated by generating the zoom information by the distance to the subject, calculating a range of depth of field on the basis of the zoom information and the distance to the subject, and generating the focusing information on the basis of the range of the depth of field.

3. The system of claim 2, wherein the plurality of sections is set so that the range of the depth of field overlaps by a preset range so that there is no missing position according to the distance to the subject.

\* \* \* \* \*